United States Patent [19]

Cagle

[11] Patent Number: 5,256,292
[45] Date of Patent: Oct. 26, 1993

[54] SCREEN FOR FILTERING UNDESIRABLE PARTICLES FROM A LIQUID

[76] Inventor: William S. Cagle, 7021 E. 77th Pl., Tulsa, Okla. 74133

[21] Appl. No.: 893,715

[22] Filed: Jun. 5, 1992

Related U.S. Application Data

[63] Continuation-in-part of Ser. No. 870,486, Apr. 16, 1992.

[51] Int. Cl.⁵ .............................................. B01D 39/10
[52] U.S. Cl. .................. 210/499; 139/383 R; 139/425 R; 210/507; 245/2
[58] Field of Search ................ 210/499, 507; 166/227, 166/230; 245/2, 8; 139/383 R, 425 R; 29/163.8

[56] References Cited

U.S. PATENT DOCUMENTS

| | | | |
|---|---|---|---|
| 346,317 | 7/1886 | Scarles | 245/8 |
| 713,544 | 11/1902 | Ware | |
| 1,934,643 | 11/1933 | Rafton | |
| 2,035,758 | 3/1936 | Pierce | |
| 2,046,458 | 7/1936 | Johnson | |
| 2,217,370 | 10/1940 | Johnston | |
| 2,333,618 | 11/1943 | Strauss | 210/499 |
| 2,341,783 | 2/1944 | Jens | |
| 2,596,803 | 5/1952 | Williamson et al. | 139/383 R |
| 2,858,894 | 11/1958 | Akeyson | |
| 3,087,699 | 4/1963 | Foster | 245/2 |
| 3,132,099 | 5/1964 | Eilhauer | 210/507 |
| 3,231,091 | 1/1966 | Kingsbury | 210/335 |
| 3,268,990 | 8/1966 | Adler | |
| 3,502,116 | 3/1970 | Crawford | 210/499 |
| 4,022,692 | 5/1977 | Janneck | 210/494.3 |
| 4,494,603 | 1/1985 | Harguindey | 210/497.1 |
| 4,821,800 | 4/1989 | Scott | 210/291 |
| 5,004,049 | 4/1991 | Arterbury | 166/228 |

FOREIGN PATENT DOCUMENTS 288983 4/1991 Fed. Rep. of Germany ...... 210/499

OTHER PUBLICATIONS

Publication "Pattern and Loom" by John Becker with the collaboration of Donald B. Wagner, Rhodos, Kirsten Becker, Copenhagen (1987).

*Primary Examiner*—Robert A. Dawson
*Assistant Examiner*—Sun Uk Kim

[57] ABSTRACT

A screen for filtering undesirable particles from a liquid has a flat parallel array of warp filaments spaced apart less than a preselected minimal linear dimension of the undesirable particles transverse to a parallel array of pairs of shute filaments, the shute filaments of each pair being oppositely woven about and twisted 180° at the warp filaments to secure the warp filaments and maintain the spaces therebetween, the spaces between pairs of shute filaments being greater than the preselected minimal linear dimension of the undesirable particles so that the screen is characterized by rectangular flow apertures therethrough, the apertures being an access ratio ranging as great as 4 to 10, even for filaments having diameter ranging as small as 0.007 to 0.001 inches.

12 Claims, 3 Drawing Sheets

SCREEN FOR FILTERING UNDESIRABLE PARTICLES FROM A LIQUID

RELATED APPLICATIONS

This application is a continuation-in-part of my presently pending application Ser. No. 07/870,486, filed Apr. 16, 1992, and entitled "Screen", inventor, William S. Cagle.

BACKGROUND OF THE INVENTION

This invention relates generally to screens and more particularly concerns screens used for filtering undesirable particles from a liquid such as oil well drilling fluids.

A variety of woven cloth screens for use in removing particles from a liquid are designed to provide a tortuous path for the liquid. These woven cloths, including the typical weave, twill, dutch weave or twill dutch weave cloths, exhibit low fluid conductance characteristics, their very purpose being the formation of the tortuous flow path. Since the rate of flow is minimal, the filtering process is concomitantly slow. Furthermore, the screens need frequent cleaning to maintain any degree of functionality.

Other screens have been developed which do provide an open surface area and therefore permit direct or nontortuous flow through the screen. While these screens do provide better conductance characteristics, the fluid conductance is generally limited by the permissible ratio of length to width in the interstices between the screen filaments and the fineness of the filaments. As the spacing between filaments increases, the likelihood of deformation of the filaments from the parallel increases, with result that larger than desired particles can pass through the screen. In order to maintain a workable relationship, the size of the rectangular interstices in these screens is generally minimal and the length to width ratio is generally less than three unless coarse, stiff filaments are used. Sometimes higher ratios can be achieved by bonding together the crossing filaments of the screen. However, bonding is a complex and costly process with negative side effects. Bonding may be accomplished by coating the filaments with a bonding material, which in turn increases the diameter of the filaments and further reduces the fluid conductance of the screen. Bonding is not a routine practice.

It is, therefore, an object of this invention to provide a screen for filtering undesirable particles from a liquid having fluid conductance characteristics superior to those presently known. It is a further object of this invention to provide such a screen having length to width or aspect ratios of the interstices therein in excess of ratios presently in use for relatively thin filaments. A further object of this invention is to provide a screen which provides improved fluid conductance characteristics without the need for coating the filaments or bonding the filaments of the screen together.

SUMMARY OF THE INVENTION

In accordance with the invention, a screen is provided for filtering undesirable particles from a liquid. A flat parallel array of warp filaments are spaced at less than a preselected minimal linear dimension of undesirable particles. A parallel array of pairs of shute filaments runs transverse to the warp filaments. The shute filaments of each pair are oppositely woven about and twisted between the warp filaments to secure the warp filaments and maintain the spaces therebetween. The pairs of shute filaments have spaces therebetween greater than the preselected minimal linear dimension of the undesirable particles so that the screen is characterized by rectangular flow apertures therethrough.

Screens formed by this weaving and twisting of pairs of shute filaments transverse to warp filaments, not only work effectively for presently available meshes having low aspect ratios or large filament diameters, but also work effectively for meshes having high aspect ratios and relatively small filament diameters not achievable using presently known weaves.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
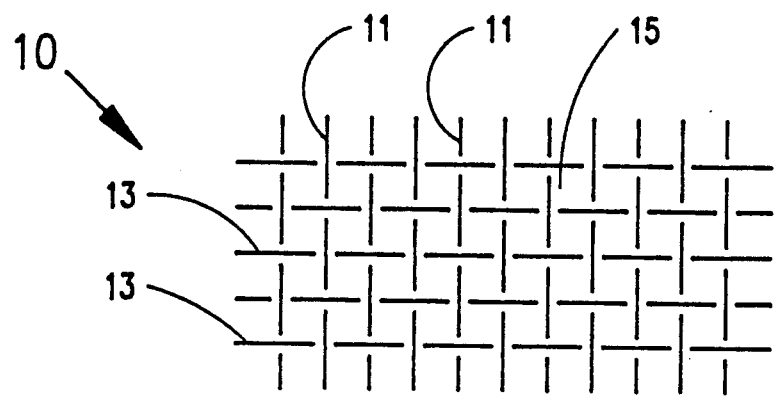
FIG. 1 is an enlarged fragmentary one line top view illustrating a typical screen having substantially square interstices.

Turning first to FIG. 1, a typical square interstices screen 10 is illustrated. The screen 10 consists of a plurality of warp filaments 11 and shute filaments 13 interlaced to form a plurality of substantially square interstices 15. As shown, the screen 10 is formed by alternately weaving the shute filaments 13 over and under the warp filaments 11. In a typical mesh, the interstices 15 might range from approximately 37 to 2464 microns in a 400 to 8 filament per inch mesh using filaments from 0.001 to 0.02 inches in diameter. It will be readily apparent by observation of this square mesh arrangement that the total open area of the screen is diminished by the number of filaments 11 and 13 multiplied by the diametric cross-sectional area of each filament. Thus, the conductance of the screen 10 could be improved if, for example, the number of shute filaments 13 and for the diameter of the filaments 11 and 13 could be reduced.

Figure 2:
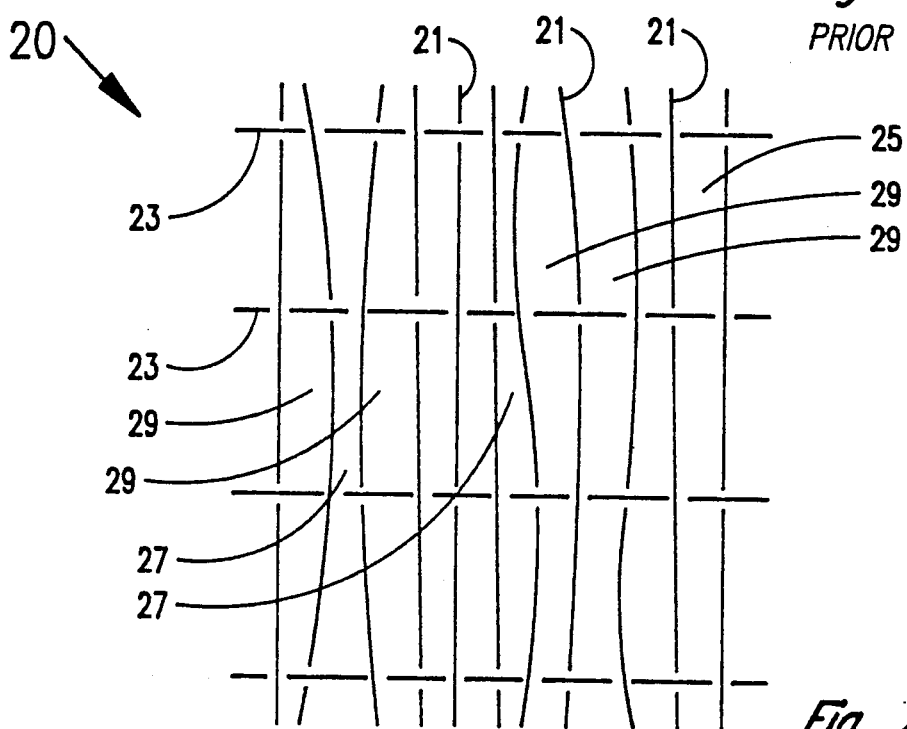
FIG. 2 is an enlarged fragmentary one line top view illustrating a typical screen having rectangular interstices of a ratio greater than three.

Turning to FIG. 2, a rectangular interstices screen 20 is illustrated which may be considered to be the same as the screen 10 illustrated in FIG. 1 with three of every four thicker shute filaments 13 removed. Thus, the space between the thinner shute filaments 23 is approximately four times the space between the warp filaments 21, providing interstices 25 which have a length approximately four times their width. However, screens having such a length/width interstices or aspect ratio are not presently available in relatively fine filament meshes because of the problem illustrated in FIG. 2. As shown, the spacing between the warp filaments 21 is easily distorted because the lack of three of the four shut filaments 23 allows the warp filaments 21 to shift their position in relation to the shute filaments 23. This results in some interstices 27 having smaller than expected widths while other interstices 29 have greater than expected widths. The result is that the interstices 29 permit particles of greater size than desired to pass through the rectangular screen 20.

Figure 3:
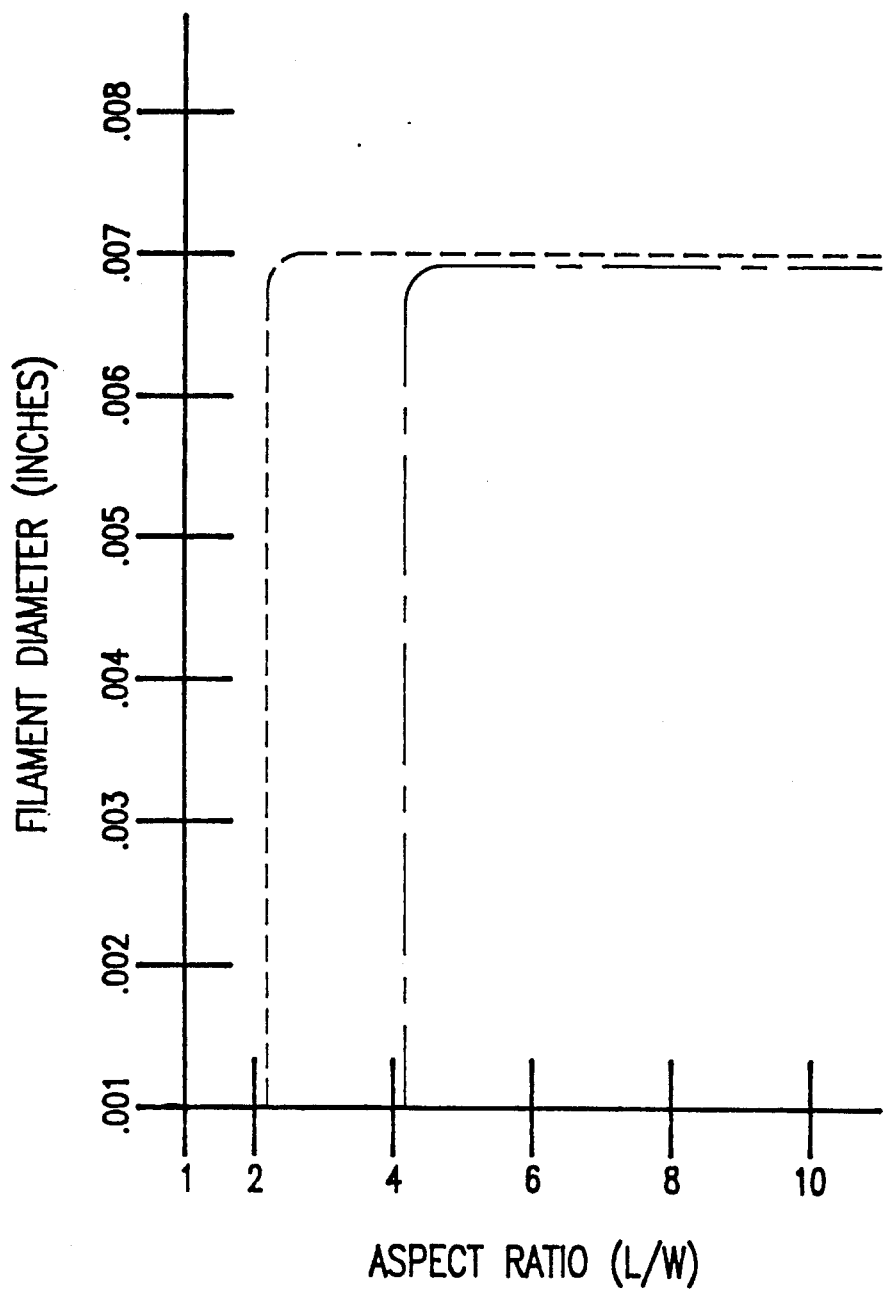
FIG. 3 is a graph illustrating the effective limits of aspect ratio and filament diameter for typical screens such as shown in FIG. 2.

The relationship of aspect ratios and filament diameters resulting in filament separation in screens made in presently known weaves is illustrated in FIG. 3. For meshes having an aspect ratio less than two, filaments of 0.001 inches diameter and greater will not separate. For meshes having an aspect ratio between two and four, separation may occur where filaments less than 0.007 inch diameter are used. For meshes having an aspect ratio greater than four, separation will occur where filaments less than 0.007 inch diameter are used.

Figure 4:
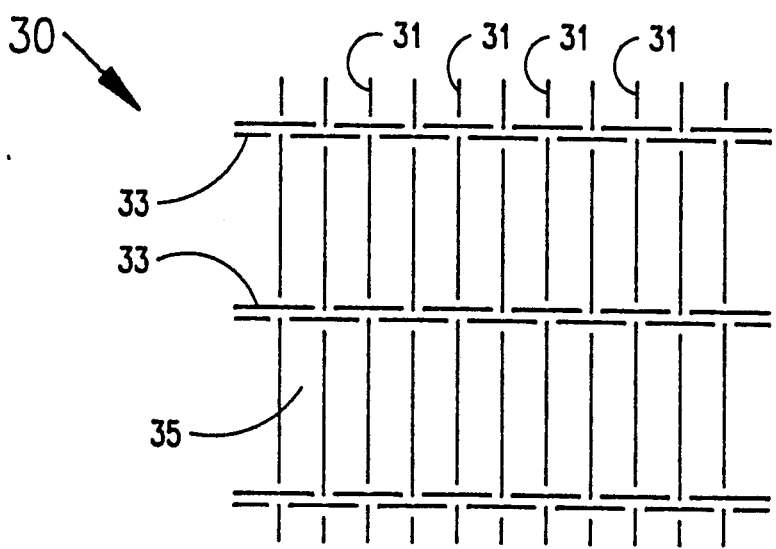
FIG. 4 is an enlarged fragmentary one line face top of the double shute screen of the present invention having rectangular interstices of a ratio in the order of four.
Figure 5:
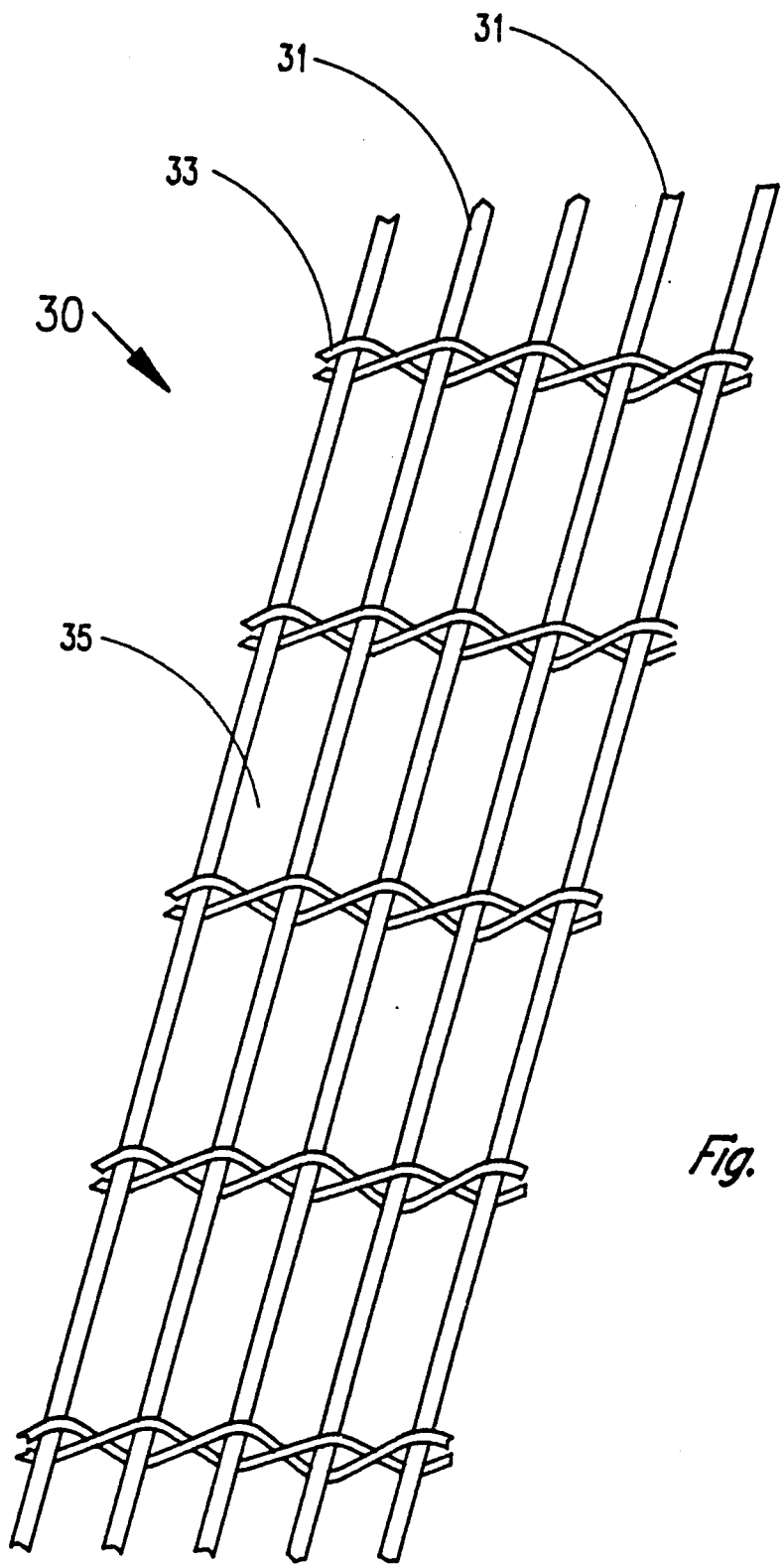
FIG. 5 is an enlarged fragmentary perspective view of the screen of FIG. 4.

This problem is significantly minimized by the double shute screen 30 illustrated in FIG. 4. The double shute screen 30 is characterized in that the warp filaments 31 are secured by pairs of shute filaments 33 to form interstices 35. The lengths of the interstices 35 is, as shown, approximately four times the width of the interstices 35. As can be most clearly seen in FIG. 5, the pairs of shute filaments 33 are oppositely woven over and under the warp filaments 31 and twisted 180° between warp filaments to lock the warp filaments 31 in place and prevent the relative shift of the warp filaments 31 in relation to the shute filaments 33 which occurred in the screen 20 illustrated in FIG. 2. In the double shute configuration of FIGS. 4 and 5, the interstices length to width or aspect ratio can be as much as or even exceed 10 for filaments less than 0.007 inch diameter and as thin as 0.001 inch diameter. As before, the rigidity of the filaments used still imparts stability, but a whole new range of aspect ratio to filament diameter screen has been made possible. Suffice it to say that, when comparing screens composed of relatively fine filaments of similar dimension and properties, screens employing the double shute arrangement will be used with interstices having many times the length of the interstices of screens formed by presently known weaving or bonding configurations.

Furthermore, if desirable for a given application, the bonding of screens formed in the double shute configuration is more acceptable since the decrease in open area resulting from application of the bonding material is more than compensated for by the increase of open area resulting from the elimination of shute wires. For example, for a length/width or aspect ratio of eight, six shute wires will have been eliminated from every grid segment.

In a typical double shute arrangement, anywhere from 100 to 400 warp filaments 41 per inch of screen might be typical for use in conjunction with 10 to 220 pairs of shute filaments per inch, a typical interstice being in the order of 60 by 580 microns. Warp filaments 31 and shute filaments might typically be in the range of 0.001 to 0.004 inches in diameter. Of course, the spaces between parallel pairs of shute wires 33 may be equal and the spaces between parallel pairs of warp filaments may be equal, but unequal spacings between either or both the warp 41 and shute 33 filaments could also be employed. The screens may be formed of metal or plastic filaments or filaments of any materials suited to a particular application.

While the invention has been described in relation to warp and shute filaments using the established meaning of warp filaments extending along the length of material being woven and shute filaments extending across the width of the material, a reversal of these warp and shute relationships is fully within the scope of this invention.

Thus, it is apparent that there has been provided, in accordance with the invention, a screen that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A screen for filtering undesirable particles from a liquid comprising:
   a first parallel array of filaments having spaces therebetween less than a preselected minimal linear dimension of said undesirable particles; and
   a second parallel array of pairs of filaments thinner than said filaments of and transverse to said first array, said filaments of each pair being oppositely woven over and under said filaments of said first array and twisted 180° between said filaments of said first array to secure said first array filaments and maintain said spaces therebetween, said pairs of filaments having spaces therebetween at least four times said preselected minimal linear dimension of said undesirable particles.

2. A screen for filtering undesirable particles from a liquid comprising:
   a flat parallel array of warp filaments having spaces therebetween less than a preselected minimal linear dimension of said undesirable particles; and
   a parallel array of pairs of shute filaments thinner than and transverse to said warp filaments, said shute filaments of each pair being oppositely woven over and under and twisted 180° between said warp filaments to secure said warp filaments and maintain said spaces therebetween, said pairs of shute filaments having spaces therebetween greater than said preselected minimal linear dimension of said undesirable particles,
   said spaces between said warp filaments and said spaces between said pairs of shute filaments defining rectangular flow apertures through said screen having an aspect ratio of at least four to one.

3. A screen according to claim 2, said warp and shute filaments being bonded together at points of contact thereof.

4. A screen according to claim 2, said warp filaments being arrayed at approximately 100 to 400 filaments per inch.

5. A screen according to claim 2, said pairs of shute filaments being arrayed at approximately 10 to 220 pairs per inch.

6. A screen according to claim 2, said arrays of warp and pairs of shute filaments defining a mesh having openings in the order of approximately 37 to 140 microns by approximately 75 to 2500 microns.

7. A screen according to claim 2, said warp filaments being less than 0.007 inches in diameter.

8. A screen according to claim 2, said shute filaments being less than 0.007 inches in diameter.

9. A screen according to claim 2, said warp filaments and said shute filaments being less than 0.007 inches in diameter and said warp filaments being of greater diameter than said shute filaments.

10. A screen according to claim 2, said pairs of shute filaments having spaces therebetween ranging from at least four times to as much as ten times the length of said spaces between said warp filaments.

11. A screen according to claim 2, said warp filaments being equally spaced apart.

12. A screen according to claim 2, said pairs of shute filaments being equally spaced apart.

* * * * *